United States Patent
Ito et al.

(10) Patent No.: US 11,824,975 B2
(45) Date of Patent: Nov. 21, 2023

(54) COMMUNICATION DEVICE, COMPUTER PROGRAM PRODUCT, AND COMMUNICATION SYSTEM USING QUANTUM KEY DISTRIBUTION

(71) Applicant: KABUSHIKI KAISHA TOSHIBA, Tokyo (JP)

(72) Inventors: Masashi Ito, Yokohama Kanagawa (JP); Yoshimichi Tanizawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 17/461,854

(22) Filed: Aug. 30, 2021

(65) Prior Publication Data
US 2022/0131689 A1 Apr. 28, 2022

(30) Foreign Application Priority Data
Oct. 26, 2020 (JP) .................. 2020-179079

(51) Int. Cl.
*H04L 9/08* (2006.01)
*H04L 9/32* (2006.01)

(52) U.S. Cl.
CPC .......... *H04L 9/0852* (2013.01); *H04L 9/0822* (2013.01); *H04L 9/0861* (2013.01); *H04L 9/3215* (2013.01)

(58) Field of Classification Search
None
See application file for complete search history.

(56) References Cited

U.S. PATENT DOCUMENTS

| | | | |
|---|---|---|---|
| 2008/0281942 A1 | 11/2008 | Nakahara et al. | |
| 2013/0022043 A1* | 1/2013 | Lee | H04L 63/0428 370/389 |
| 2016/0234018 A1* | 8/2016 | Frohlich | H04B 10/70 |

FOREIGN PATENT DOCUMENTS

| | | |
|---|---|---|
| CN | 102892111 A | 1/2013 |
| EP | 3 541 007 A1 | 9/2019 |
| JP | 2019-161557 A | 9/2019 |
| KR | 10-2013-0010690 A | 1/2013 |

OTHER PUBLICATIONS

Taofiq K. Paraïso et al., "A modulator-free quantum key distribution transmitter chip," npj Quantum Information, vol. 5, Art. 42, 6 pages (2019).

* cited by examiner

*Primary Examiner* — William J. Goodchild
(74) *Attorney, Agent, or Firm* — Finnegan, Henderson, Farabow, Garrett & Dunner, LLP

(57) ABSTRACT

According to an embodiment, a communication device includes a plurality of communication processors, and one or more processors. Each of the communication processors is configured to generate an encryption key by quantum key distribution with an external communication device, encrypt data by using the generated encryption key, and transmit the data to the external communication device. The one or more processors are configured to: divide data requested to be transmitted by an application into a plurality of pieces of transmission data; and determine, from among the plurality of communication processors, one or more communication processors to be used for transmission of the divided plurality of pieces of the transmission data.

11 Claims, 13 Drawing Sheets

FIG.7

| QKD MODULE 130a | | | QKD MODULE 130b | | | QKD MODULE 130c | | |
|---|---|---|---|---|---|---|---|---|
| KEY RESIDUAL QUANTITY [bit] | KEY GENERATION SPEED [bps] | WEIGHT | KEY RESIDUAL QUANTITY [bit] | KEY GENERATION SPEED [bps] | WEIGHT | KEY RESIDUAL QUANTITY [bit] | KEY GENERATION SPEED [bps] | WEIGHT |
| 1024 | 256 | 10 | 256 | 128 | 3 | 2048 | 512 | 20 |

FIG.8

| No | DISTRIBUTION DESTINATION |
|---|---|
| 1 | QKD MODULE 130a |
| 2 | QKD MODULE 130b |
| 3 | QKD MODULE 130c |
| 4 | QKD MODULE 130c |
| 5 | QKD MODULE 130a |
| 6 | QKD MODULE 130c |
| 7 | QKD MODULE 130c |
| 8 | QKD MODULE 130a |
| | ... |

| APPLICATION | PRI-ORITY LEVEL |
|---|---|
| 111a | 7 |
| 111b | 0 |

FIG.13

| No | DISTRIBUTION DESTINATION | APPLICATION |
|---|---|---|
| 1 | QKD MODULE 130a | 111a |
| 2 | QKD MODULE 130b | 111b |
| 3 | QKD MODULE 130c | 111a |
| 4 | QKD MODULE 130c | 111a |
| 5 | QKD MODULE 130a | 111a |
| 6 | QKD MODULE 130c | 111a |
| 7 | QKD MODULE 130c | 111a |
| 8 | QKD MODULE 130a | 111a |
| | ... | ... |

| APPLICATION | DELAY [ms] | SPEED [bps] | DATA SIZE [byte] | PERIOD OF TIME [sec] |
|---|---|---|---|---|
| 111a | <1 | >40K | 200 | >0.01 |
| 111b | <20 | >4K | 100 | >0.002 |

FIG.18

| QKD MODULE 130a | | QKD MODULE 130b | | QKD MODULE 130c | |
|---|---|---|---|---|---|
| KEY RESIDUAL QUANTITY [bit] | KEY GENERATION SPEED [bps] | KEY RESIDUAL QUANTITY [bit] | KEY GENERATION SPEED [bps] | KEY RESIDUAL QUANTITY [bit] | KEY GENERATION SPEED [bps] |
| 1024 | 256 | 256 | 128 | 2048 | 512 |

FIG.19

| QKD MODULE | MAXIMUM SPEED [bps] | TRANSMISSION TIME [sec] | MAINTAINING PERIOD [sec] | SPEED AFTER MAINTAINING PERIOD [bps] | TRANSMISSION TIME AFTER MAINTAINING PERIOD [sec] | PROPAGATION DELAY [sec] |
|---|---|---|---|---|---|---|
| 130a | 16000 | 0.1 | 0.012 | 3200 | 0.5 | 0.00005 |
| 130b | 4800 | 0.333 | 0.003 | 1600 | 1.0 | 0.00005 |
| 130c | 32000 | 0.05 | 0.025 | 6400 | 0.25 | 0.00005 |
| 130a+130c | 48000 | 0.1 | 0.012 | 9600 | 0.5 | 0.00005 |

| No | DISTRIBUTION DESTINATION | APPLICATION |
|---|---|---|
| 1 | QKD MODULE 130a | 111a |
| 2 | QKD MODULE 130b | 111b |
| 3 | QKD MODULE 130c | 111a |
| 4 | QKD MODULE 130c | 111a |
| 5 | QKD MODULE 130a | 111a |
| 6 | QKD MODULE 130c | 111a |
| 7 | QKD MODULE 130c | 111a |
| 8 | QKD MODULE 130a | 111a |
| ... | ... | ... |

COMMUNICATION DEVICE, COMPUTER PROGRAM PRODUCT, AND COMMUNICATION SYSTEM USING QUANTUM KEY DISTRIBUTION

CROSS-REFERENCE TO RELATED APPLICATIONS

This application is based upon and claims the benefit of priority from Japanese Patent Application No. 2020-179079, filed on Oct. 26, 2020; the entire contents of which are incorporated herein by reference.

FIELD

Embodiments described herein relate generally to a communication device, a computer program product, and a communication system.

BACKGROUND

Quantum key distribution (QKD) techniques are known. The quantum key distribution techniques are techniques safely sharing an encryption key by using single photons successively transmitted between a transmission device and a reception device connected with an optical fiber. A device transmitting and receiving data with a single QKD module has been developed as a communication device using quantum key distribution. A QKD module is, for example, a hardware circuit sharing an encryption key by QKD and transmitting and receiving data by using the shared encryption key.

An object to be solved by an embodiment is to provide a communication device, a communication method, a computer program product, and a communication system capable of increasing transmittable and receivable data quantity.

BRIEF DESCRIPTION OF THE DRAWINGS

FIG. 7 is a diagram explaining a method for preparing the distribution list;
FIG. 8 is a diagram explaining the method for preparing the distribution list;
FIG. 13 is a diagram illustrating an example of a distribution list;
FIG. 18 is a diagram illustrating an example of a key residual quantity and key generation speed of each of QKD modules;
FIG. 19 is a diagram illustrating examples of predicted communication delay and communication speed.

DETAILED DESCRIPTION

According to an embodiment, a communication device includes a plurality of communication processors, and one or more processors. Each of the communication processors is configured to generate an encryption key by quantum key distribution with an external communication device, encrypt data by using the generated encryption key, and transmit the data to the external communication device. The one or more processors are configured to: divide data requested to be transmitted by an application into a plurality of pieces of transmission data; and determine, from among the plurality of communication processors, one or more communication processors to be used for transmission of the divided plurality of pieces of the transmission data.

Preferred embodiments of a communication device according to an embodiment will be explained hereinafter in detail with reference to attached drawings.

A possible method for increasing data quantity of data transmitted and received using an encryption key shared by QKD is, for example, a method of using a plurality of QKD modules. The generation speed (key generation speed) of the encryption key and the residual quantity (key residual quantity) of the encryption key of each of the QKD modules may fluctuate according to an influence (such as the atmospheric temperature, the humidity, and the wind speed) of the external environment for the communication medium (such as an optical cable) used for sharing of the encryption key and existence of the eavesdropper and the like. Specifically, the QKD modules may have a difference in key generation speed and key residual quantity. For this reason, for example, when the system is configured to transmit a plurality of pieces of transmission data acquired by dividing data to be transmitted such that the pieces of transmission data are simply uniformly distributed to the QKD modules, a communication wait occurs in the QKD module lacking the encryption key, and the communication quality may deteriorate.

In each of the following embodiments, to increase the data quantity, a plurality of pieces of transmission data acquired by dividing data to be transmitted are distributed and transmitted to a plurality of QKD modules. In addition, in each of the embodiment, the QKD modules to which the transmission data is distributed are determined to avoid decrease in communication quality.

First Embodiment

Figure 1:
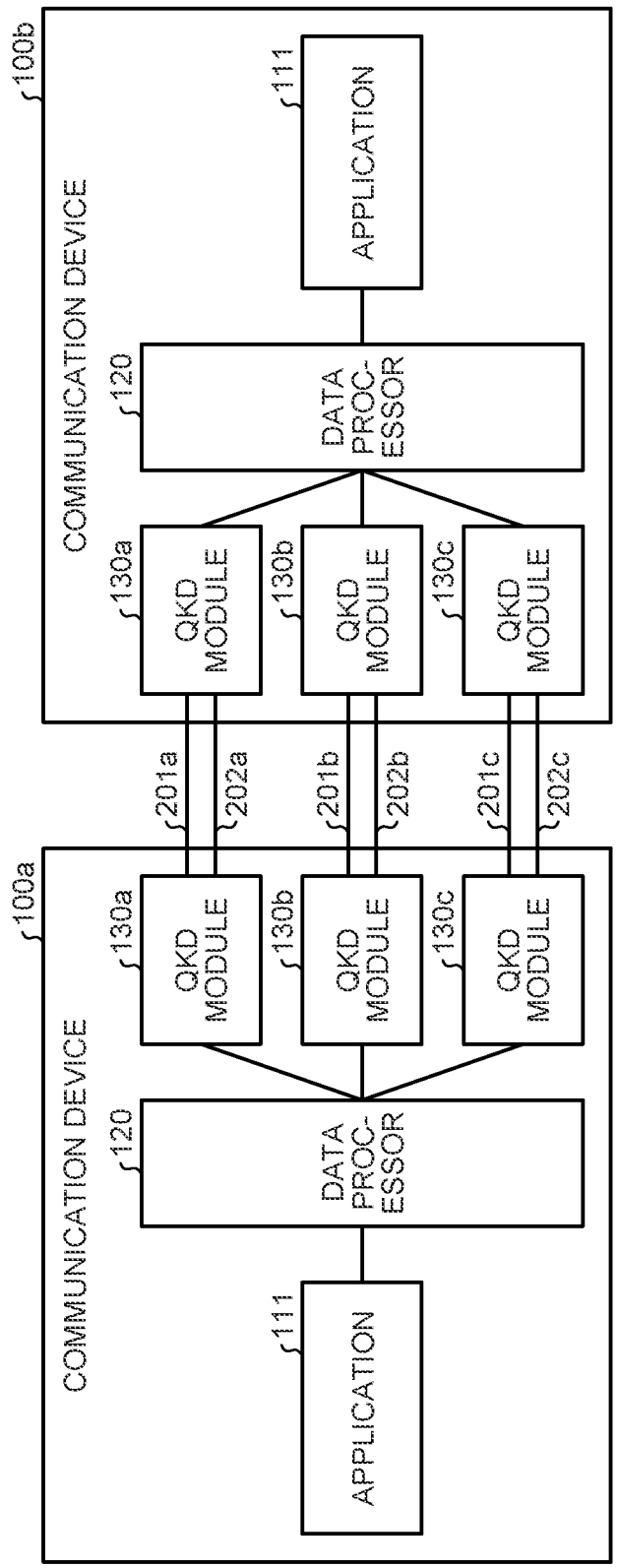
FIG. 1 is a block diagram of a communication system according to a first embodiment.

FIG. 1 is a block diagram illustrating an example of configuration of a communication system including a communication device according to a first embodiment. As illustrated in FIG. 1, the communication system according to the present embodiment has a structure in which a communication device 100a and a communication device 100b are connected with each other with communication media 201a to 201c and communication media 202a to 202c.

The communication devices 100a and 100b have the same structure, and they are simply referred to as "communication device 100" when it is unnecessary to distinguish them. The communication device 100 includes an application 111, a data processor 120, and QKD modules 130a, 130b, and 130c.

The application 111 executes processing including generation of data to be transmitted. FIG. 1 illustrates one application 111, but the communication device 100 may include a plurality of applications 111. The present embodiment illustrates an example including one application 111.

The processing executed with the application 111 may be any desired processing. For example, the application 111 of each of the communication devices 100 may be configured to implement the following service.

(S1) The application 111 of the communication device 100a acquires data (sensor data) from a sensor and transmits the data to the application 111 of the communication device 100b. The application 111 of the communication device 100b displays statistics of the received sensor data.

(S2) The application 111 of the communication device 100a requests data from the application 111 of the communication device 100b. The application 111 of the communication device 100b transmits the requested data to the application 111 of the communication device 100a serving as the request source (such as Web service).

(S3) The application 111 of the communication device 100a and the application 111 of the communication device 100b mutually transmit sound and images (such as telephone service).

The QKD modules 130a to 130c (an example of communication processor) generate (share) an encryption key by QKD with another communication device 100 (external communication device), and encrypt data using the generated encryption key to transmit and receive the data. The QKD modules 130a to 130c also decrypt data received from the other communication device 100 with the encryption key shared with the communication device 100.

Each of the QKD modules 130 has a function of storing the generated encryption key therein, and notifying the key residual quantity corresponding to the quantity of the stored encryption key and the key generation speed in response to an inquiry from the data processor 120. The key residual quantity is expressed with, for example, the number of bits of the encryption key stored in the QKD module 130.

Each of the QKD modules 130a to 130c is implemented with a processor, such as a dedicated integrated circuit (IC), that is, hardware. The QKD modules 130a to 130c may have the same structure (for example, the same product manufactured by the same manufacturer) or different structures (for example, products manufactured by different manufacturers).

The QKD modules 130a to 130c are connected with the QKD modules 130a to 130c of the other communication device 100 via the communication media 201a to 201c, respectively. The communication media 201a to 201c are media used for generation of an encryption key and formed of, for example, optical fibers. The communication media 201a to 201c are also referred to as "quantum communication paths".

The QKD modules 130a to 130c are also connected with the QKD modules 130a to 130c of the other communication device 100 via the communication media 202a to 202c, respectively. The communication media 202a to 202c are media used for transmission and reception of data encrypted with the encryption key. The communication media 202a to 202c are also referred to as "classical communication paths".

The number of QKD modules 130a to 130c are not limited to three, but may be two or four or more. The QKD modules 130a to 130c are also simply referred to as "QKD modules 130" when it is unnecessary to distinguish them.

In the same manner, the communication media 201a to 201c are also simply referred to as "communication media 201" when it is unnecessary to distinguish them, and the communication media 202a to 202c are also simply referred to as "communication media 202" when it is unnecessary to distinguish them. The system may be configured to use a communication medium (such as an optical fiber) acquired by unifying the communication medium 201 and the communication medium 202 for one QKD module 130. This structure leads to cost suppression by introducing quantum cryptography on an existing fiber by wavelength multiplexing of a data signal and a quantum cryptographic signal.

The data processor 120 executes processing for data transmitted and received using the QKD modules 130. For example, the data processor 120 divides data transmitted from the application 111 into a plurality of pieces of transmission data to transmit the data with the QKD modules 130. In addition, the data processor 120 combines a plurality of pieces of data transmitted from the other communication device 100 and received with the QKD modules 130, and outputs the combined data to the application 111.

Each of the communication devices 100 (communication device 100a and communication device 100b in FIG. 1) may serve as an apparatus (transmission apparatus) transmitting data and an apparatus (reception apparatus) receiving data. The communication device 100 may have only one of functions of the transmission apparatus and the reception apparatus, or both the functions. The following explanation mainly illustrates an example in which the communication device 100 has both the functions of the transmission apparatus and the reception apparatus.

The following is an explanation of an outline of communication processing executed with the communication system according to FIG. 1. When the communication device 100a transmits data, the application 111 of the communication device 100a generates data, and transmits the generated data to the data processor 120. The data processor 120 divides the received data into a plurality of pieces of transmission data, and distributes the pieces of transmission data to the QKD modules 130a to 130c. The QKD modules 130a to 130c encrypt the pieces of transmission data using the encryption key, and transmit the transmission data to the QKD modules 130a to 130c of the opponent (communication device 100b).

The QKD modules 130a to 130c of the communication device 100b that has received the transmission data decrypt the encrypted pieces of transmission data, and thereafter transmit the pieces of transmission data to the data processor 120. The data processor 120 combines the divided pieces of transmission data, and transmits the combined transmission data to the application 111. The application 111 executes processing to the combined data.

Figure 2:
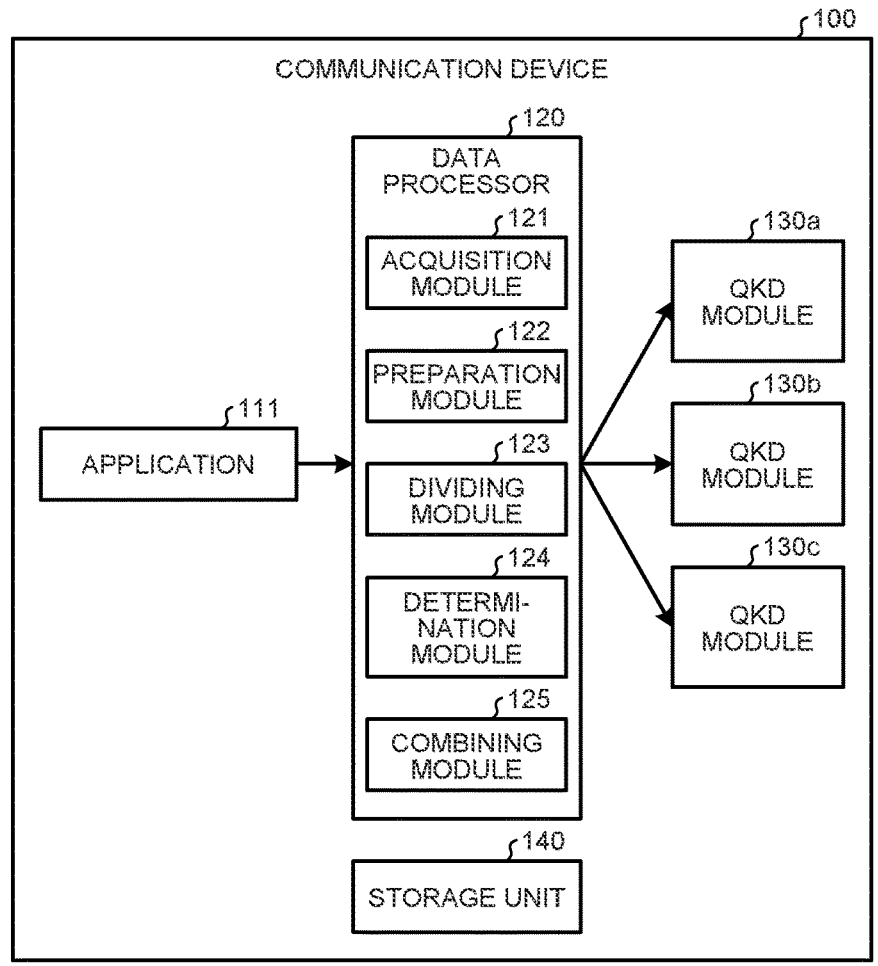
FIG. 2 is a block diagram of a communication device according to the first embodiment.

FIG. 2 is a block diagram illustrating an example of a detailed functional structure of the communication device 100 according to the first embodiment. As illustrated in FIG. 2, the communication device 100 includes the application 111, the data processor 120, the QKD modules 130a, 130b, and 130c, and a storage unit 140.

The data processor 120 includes an acquisition module 121, a preparation module 122, a dividing module 123, a determination module 124, and a combining module 125.

The acquisition module 121 acquires various types of information used for processing executed with the data processor 120. For example, the acquisition module 121 acquires the key residual quantity and the key generation speed from each of the QKD modules 130a, 130b, and 130c.

The preparation module 122 prepares a distribution list serving as information referred to when the determination module 124 determines the distribution destinations of the transmission data.

The dividing module 123 divides data requested to be transmitted by the application 111. For example, the dividing module 123 divides data received from the application 111 into a plurality of pieces of transmission data having a size of data transmitted with the QKD modules. The size of the pieces of transmission data may be fixed or variable. The dividing module 123 provides the pieces of transmission data with information to enable the combining module 125 of the other communication device 100 to combine the divided pieces of transmission data to restore the original data. For example, the dividing module 123 sets information (such as a sequence number) indicating the order of the piece of transmission data in a header of the piece of transmission data.

The determination module 124 determines QKD modules 130 used for transmission of the pieces of transmission data divided with the dividing module 123. For example, the determination module 124 determines the QKD modules 130 used for transmission of the pieces of transmission data such that the QKD module 130 having the key generation speed and the key residual quantity at least one of which is larger (higher) than that of the other QKD modules 130 transmits more transmission data. It can also be said that the determination module 124 determines the ratio of the pieces of transmission data transmitted with the respective QKD modules 130 in accordance with at least one of the ratios of the key generation speed and the key residual quantity.

The combining module 125 combines a plurality of pieces of transmission data acquired by receiving and decrypting the pieces of transmission data with the QKD modules 130. For example, the combining module 125 combines the pieces of transmission data with reference to the sequence numbers set in the pieces of transmission data to restore the data before division.

Each of the units (application 111 and data processor 120) described above is implemented with, for example, one or a plurality of processors. For example, each of the units described above may be implemented by executing computer programs with a processor, such as a central processing unit (CPU), that is, software. Each of the units described above may be implemented with a processor, such as a dedicated integrated circuit (IC), that is, hardware. Each of the units described above may be implemented with software and hardware used in combination. In the case of using a plurality of processors, each of the processors may implement one of the units, or two of more of the units.

The storage unit 140 stores therein various types of information used with the communication device 100. For example, the storage unit 140 stores therein a distribution list prepared with the preparation module 122. The storage unit 140 may be formed of any generally used storage medium, such as a flash memory, a memory card, a random access memory (RAM), a hard disk drive (HDD), and an optical disk.

Figure 3:
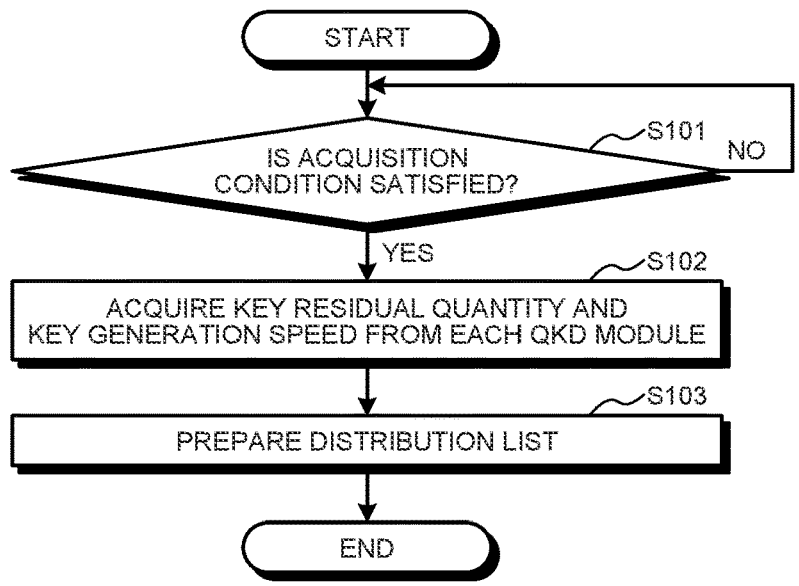
FIG. 3 is a flowchart of distribution list preparation processing according to the first embodiment.

The following is an explanation of distribution list preparation processing executed with the communication device 100 according to the first embodiment. FIG. 3 is a flowchart illustrating an example of the distribution list preparation processing according to the first embodiment.

First, the acquisition module 121 determines whether the current state satisfies the condition (acquisition conditions) for acquiring the key residual quantity and the key generation speed (Step S101). Because a distribution list is prepared when the acquisition condition is satisfied, the acquisition condition can also be regarded as corresponding to the preparation condition for preparing a distribution list. The acquisition condition may be any desired condition. For example, a condition as follows may be used.

(C1-1) Whether the reception state of data from the application 111 is the state "received"

(C1-2) Whether a certain time has passed from the previous acquisition

In the case of using the condition (C1-1), the application 111 may call the acquisition module 121 when the application 111 transmits data, and the acquisition module 121 may determine that data has been received when the acquisition module 121 is called from the application 111. As another example, the system may have a structure in which the application 111 writes a message to a memory or the like shared with the acquisition module 121 when the reception state of the data changes, and the acquisition module 121 polls the memory to check presence/absence of the message.

In the case of using the condition (C1-2), the timer may call the acquisition module 121, and the acquisition module 121 may determine that a certain time has passed when the acquisition module 121 is called from the timer.

When the acquisition condition is not satisfied (No at Step S101), the processing is repeated until the acquisition condition is satisfied. When the acquisition condition is satisfied (Yes at Step S101), the acquisition module 121 acquires the key residual quantity and the key generation speed from each of the QKD modules 130a, 130b, and 130c (Step S102).

The preparation module 122 prepares a distribution list with reference to the acquired key residual quantities and the key generation speeds (Step S103). The preparation module 122 stores the prepared distribution list in, for example, the storage unit 140. The details of the method for preparing the distribution list will be described later.

Figure 4:
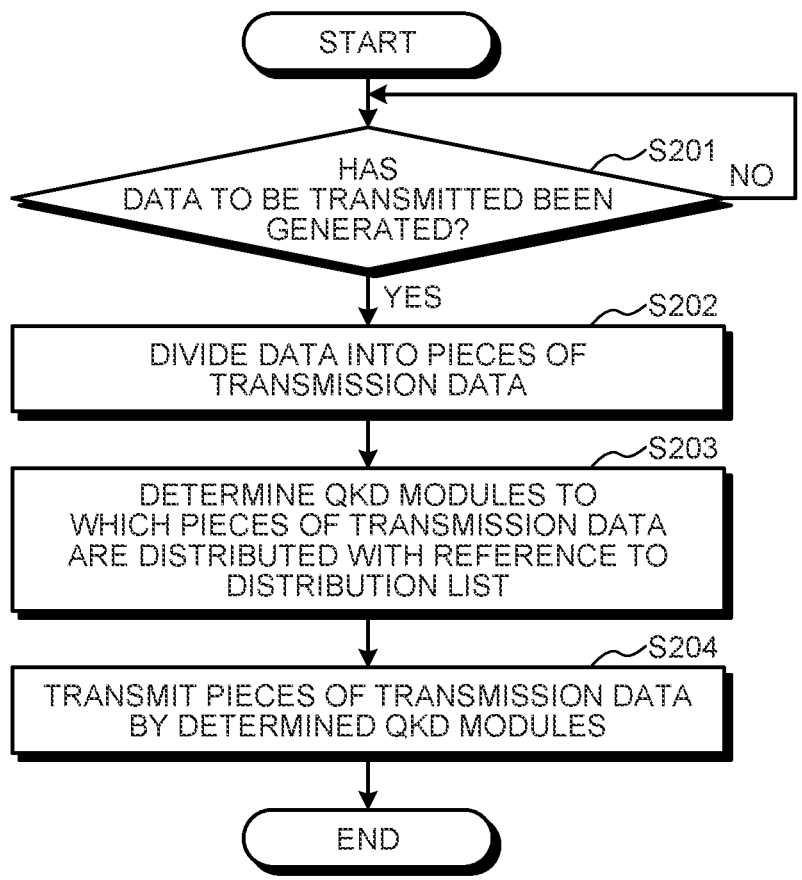
FIG. 4 is a flowchart of data transmission processing according to the first embodiment.

The following is an explanation of data transmission processing executed with the communication device 100 according to the first embodiment. The data transmission processing is processing of determining the QKD module 130 serving as the data distribution destination on the basis of the distribution list, and transmitting the pieces of transmission data with the determined QKD modules 130. FIG. 4 is a flowchart illustrating an example of the data transmission processing according to the first embodiment.

The determination module 124 determines whether data to be transmitted has been generated (Step S201). For example, the determination module 124 determines that data to be transmitted has been generated when transmission of data is requested by the application 111. When no data to be transmitted has been generated (No at Step S201), the processing is repeated until data to be transmitted occurs.

When data to be transmitted has been generated (Yes at Step S201), the dividing module 123 divides the data into a plurality of pieces of transmission data (Step S202). The determination module 124 determines the QKD module 130 serving as the distribution destination of each of the divided pieces of transmission data, with reference to the distribution list (Step S203). The determination module 124 distributes the pieces of transmission data to the determined QKD modules 130. The QKD modules 130 encrypt and transmit the respective pieces of transmission data distributed from the determination module 124 (Step S204).

The following is an explanation of examples of the method for preparing the distribution list and the method for determining the distribution destinations using the distribution list. The following explanation illustrates examples of three methods for preparing the distribution list.

Figure 5:
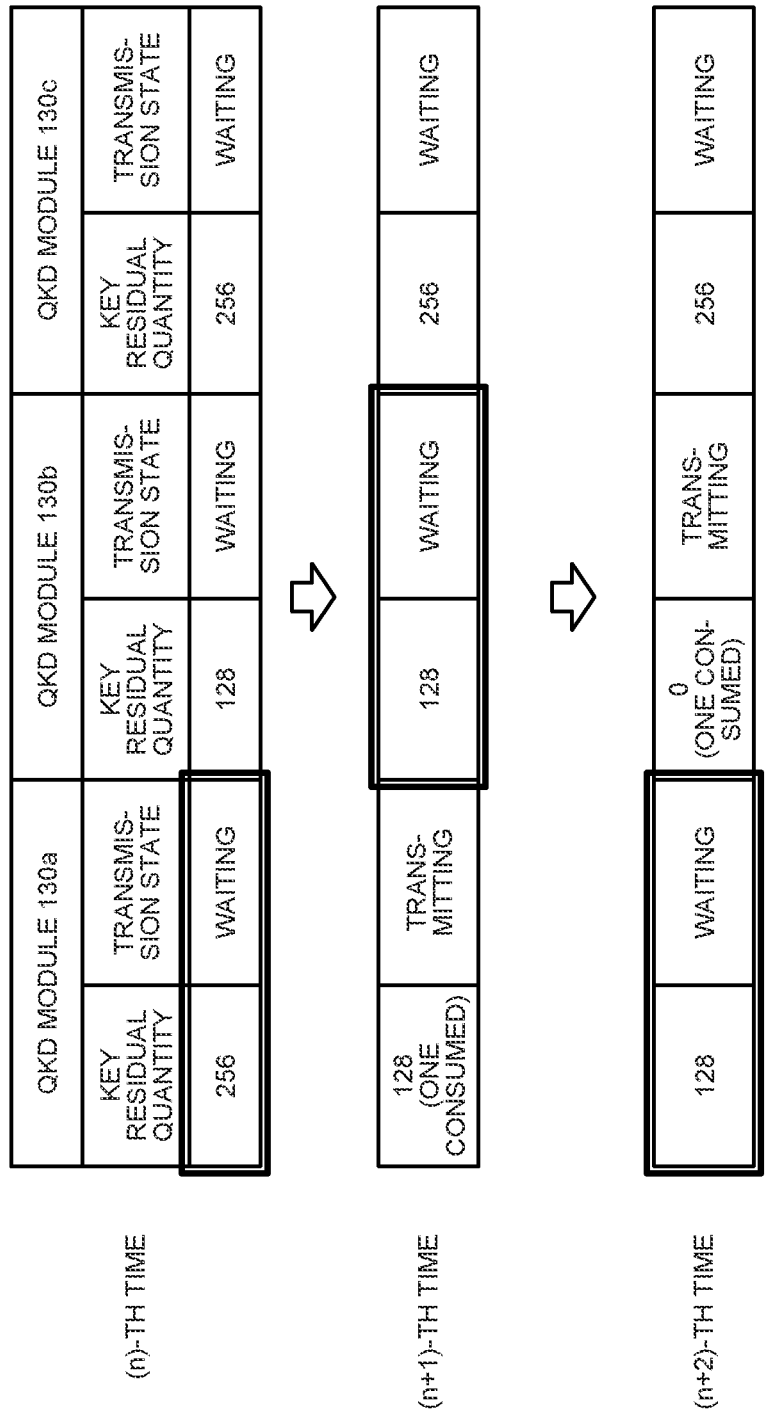
FIG. 5 is a diagram illustrating an example of a distribution list.

FIG. 5 is a diagram illustrating an example of a distribution list prepared by the first preparation method. The distribution list in FIG. 5 corresponds to an example of a distribution list in the case where a plurality of pieces of transmission data are assigned to one or more QKD modules 130.

As illustrated in FIG. 5, a distribution list includes identification information (130a, 130b, 130c), the key residual quantity, and the transmission state of each of the QKD modules 130 serving as the distribution destinations. The transmission state includes, for example, states "transmitting" and "waiting". The preparation module 122 is capable of acquiring the transmission state by, for example, estimating the transmission state on the basis of the transmission time acquired by dividing the size of the previously transmitted data by the communication speed of the QKD module 130, or inquiring of the QKD module 130 the transmission state.

The determination module 124 determines the QKD modules 130 serving as the distribution destinations as follows, on the basis of the distribution list as described above. The determination module 124 refers to the elements in the distribution list in order. In the example of FIG. 5, the distribution list includes three elements corresponding to the three QKD modules 130. While the reference order may be any desired order, for example, the determination module 124 refers to the elements from the head (the element corresponding to the QKD module 130a illustrated on the left in the example of FIG. 5) to the end (the element corresponding to the QKD module 130c illustrated on the right in the example of FIG. 5) of the distribution list.

When the key residual quantity included in the referred element has the number of bits equal to or larger than the number of bits of the encryption key used for one data transmission and the transmission state included in the referred element is the state "waiting", the determination module 124 determines the QKD module 130 identified with the identification information included in the element as the QKD module 130 of the distribution destination. When the referred element does not satisfy the conditions described above, the determination module 124 refers to the next element.

For example, when an encryption key of 128 bits is used for one data transmission, the determination module 124 determines the corresponding QKD module 130 as the distribution destination when the key residual quantity is 128 bits or more and the transmission state thereof is the state "waiting".

FIG. 5 illustrates an example of determination of the distribution destinations for successive three times ((n)-th time, (n+1)-th time, and (n+2)-th time, n is an integer of 1 or more). At the (n)-th time, the determination module 124 determines the QKD module 130a as the distribution destination. At the (n+1)-th time, because the transmission state of the QKD module 130a is "transmitting", the determination module 124 determines the QKD module 130b as the distribution destination. The expression "one consumed" indicates that an encryption key of 128 bits corresponding to one transmission has been consumed. At the (n+2)-th time, because the transmission state of the QKD module 130b is "transmitting" and the key residual quantity of the QKD module 130b is 0, the determination module 124 determines the QKD module 130a as the distribution destination.

Figure 6:
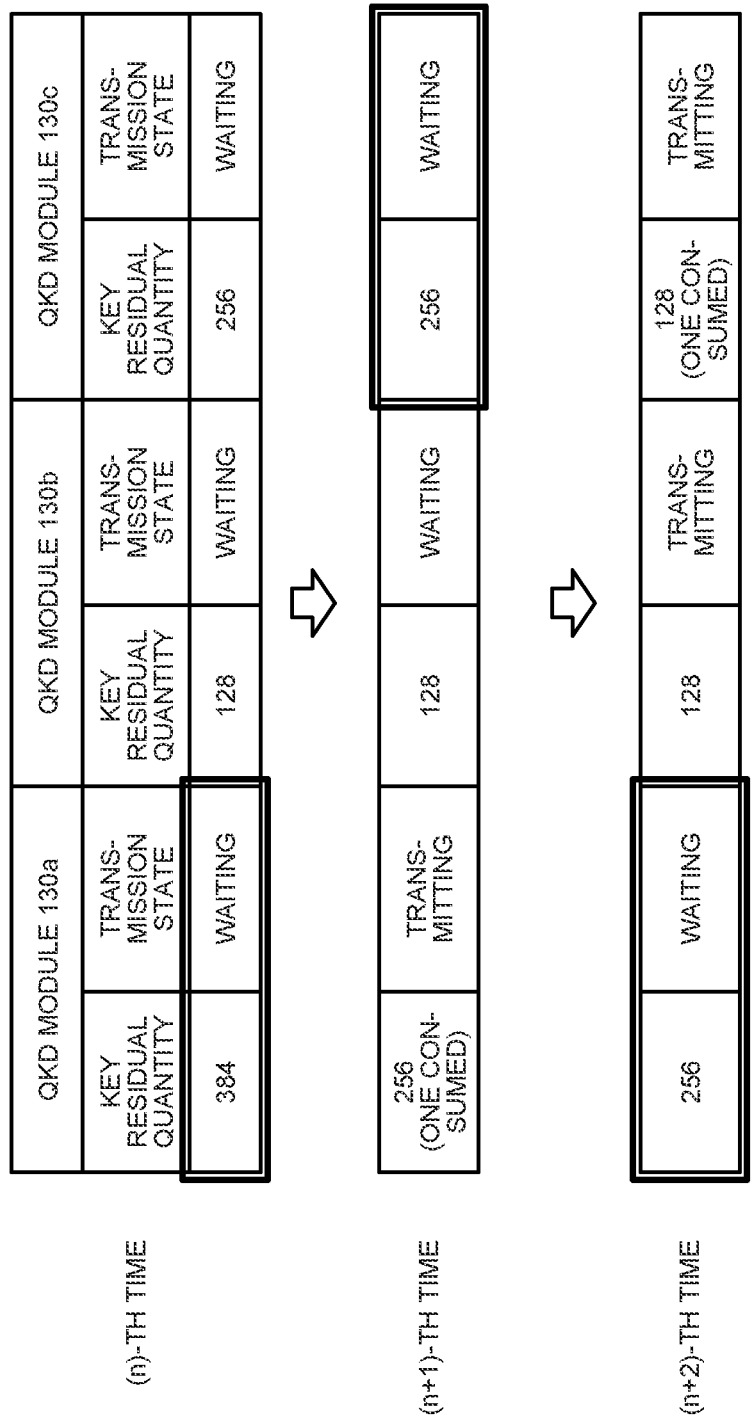
FIG. 6 is a diagram illustrating an example of the distribution list.

FIG. 6 is a diagram illustrating an example of a distribution list prepared by the second preparation method. The distribution list in FIG. 6 corresponds to an example of a distribution list in the case where a plurality of pieces of transmission data are assigned to QKD modules 130 having a larger key residual quantity (for example, having the maximum key residual quantity) than that of the other QKD modules 130.

At the (n)-th time, the determination module 124 determines the QKD module 130a having the maximum key residual quantity as the distribution destination. At the (n+1)-th time, because the transmission state of the QKD module 130a is "transmitting", the determination module 124 determines the QKD module 130c having the larger key residual quantity in the QKD module 130b and the QKD module 130c as the distribution destination. At the (n+2)-th time, the determination module 124 determines the QKD module 130a having the maximum key residual quantity as the distribution destination.

FIG. 7 and FIG. 8 are diagrams for explaining the third method for preparing a distribution list. FIG. 7 illustrates an example of weights used when the distribution list is prepared. FIG. 8 illustrates an example of a distribution list prepared by the third preparation method. The distribution list of FIG. 8 corresponds to an example of a distribution list in the case where a plurality of pieces of transmission data are assigned to QKD modules 130 having a larger weight (for example, having the maximum weight) calculated from at least one of the key residual quantity and the key generation speed than that of the other QKD module 130.

The distribution list in FIG. 8 has a form in which the identification information items of the QKD modules 130 are arranged in the distribution order, unlike FIG. 5 and FIG. 6. In the case of using the preparation method, the preparation module 122 prepares a distribution list every certain time (for example, once per second). In the distribution list, identification information items of the distribution destinations for a certain time (for example, one second) are recorded in order.

To prepare the distribution as described above, the preparation module 122 determines a weight for each of the QKD modules 130 from the key residual quantity and the key generation speed. The preparation module 122 calculates the weight by, for example, the following expression (1).

$$\text{Key residual quantity (bit)+key generation speed (bps)/unit time} \tag{1}$$

When the key residual quantities and the key generation speeds have values illustrated in FIG. 7, the weights of the respective QKD modules 130 are calculated as follows.

QKD module 130a: 1280
QKD module 130b: 384
QKD module 130c: 2560

The weights may be values acquired by dividing the weights by the greatest common divisor. FIG. 7 illustrates examples (10, 3, 20) of the weights acquired by dividing the weights by the greatest common divisor 128.

The preparation module 122 determines the assignment order of the QKD modules 130 for a certain time such that they have the use ratio according to the weight values, and prepares a distribution list describing the identification information items of the QKD modules 130 in the determined order. The preparation method can be regarded as preparing a distribution list describing the distribution destinations determined by weighted round robin using the calculated weights.

The expression (1) is an expression calculating the weight using both the key residual quantity and the key generation speed, but the weight may be calculated using either of them. For example, the value itself of the key residual quantity or the value itself of the key generation speed may be used as the weight.

As described above, according to the first embodiment, a plurality of pieces of transmission data acquired by dividing the data to be transmitted are distributed and to a plurality of QKD modules and transmitted with the QKD modules. This structure enables increase in transmittable and receivable data quantity. In addition, in the first embodiment, the QKD module to be used is determined in accordance with the key residual quantity and the key generation speed. This structure avoids interruption of transmission due to selection of the QKD module 130 lacking the encryption key. Specifically, this structure enables continuation of communication until the resources of all the QKD modules 130 are consumed.

Second Embodiment

The communication device according to a second embodiment determines the QKD module serving as the distribution destination of the data requested to be transmitted by a plurality of applications provided with priority levels with reference to the priority levels.

Figure 9:
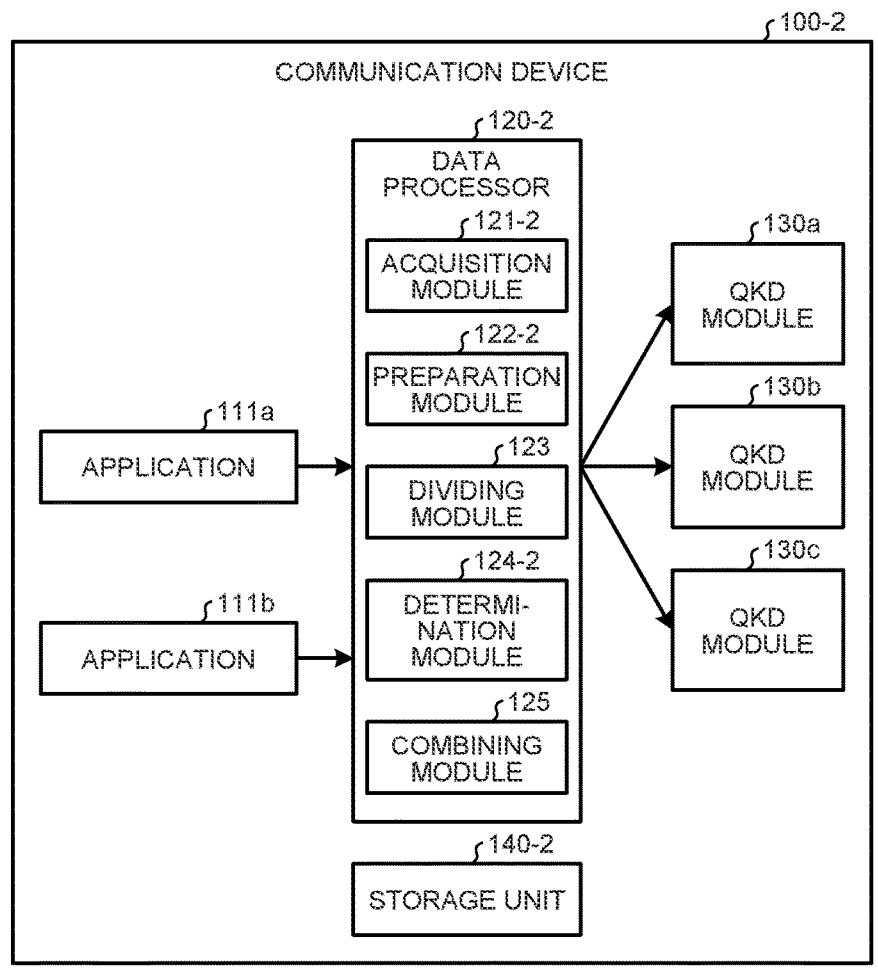
FIG. 9 is a block diagram of a communication device according to a second embodiment.

FIG. 9 is a block diagram illustrating an example of configuration of a communication device 100-2 according to the second embodiment. As illustrated in FIG. 9, the communication device 100-2 includes applications 111*a* and 111*b*, a data processor 120-2, QKD modules 130*a*, 130*b*, and 130*c*, and a storage unit 140-2.

Because the QKD modules 130*a*, 130*b*, and 130*c* are the same as those in the first embodiment, they are denoted with the same reference numerals, and an explanation thereof herein is omitted.

The communication device 100-2 includes a plurality of applications 111*a* and 111*b*. The number of applications is not limited to two, but may be three or more. Each of the applications 111*a* and 111*b* executes processing including generation of data to be transmitted. The applications 111*a* and 111*b* are also simply referred to as "applications 111" when it is unnecessary to distinguish them.

The data processor 120-2 includes an acquisition module 121-2, a preparation module 122-2, a dividing module 123, a determination module 124-2, and a combining module 125. Because the dividing module 123 and the combining module 125 are the same as those in the first embodiment, they are denoted with the same reference numerals, and an explanation thereof herein is omitted.

The acquisition module 121-2 is different from the acquisition module 121 of the first embodiment in that the acquisition module 121-2 further has a function of acquiring the priority level from each of the applications 111.

The preparation module 122-2 is different from the preparation module 122 according to the first embodiment in that the preparation module 122-2 further has a function of preparing a priority list describing the priority levels of the respective applications 111 and prepares a distribution list with reference to the priority list.

The determination module 124-2 determines the QKD modules 130 used for transmission of the pieces of transmission data, with reference to the distribution list prepared with the preparation module 122-2.

The storage unit 140-2 is different from the storage unit 140 according to the first embodiment in that the storage unit 140-2 further stores a priority list therein.

Figure 10:
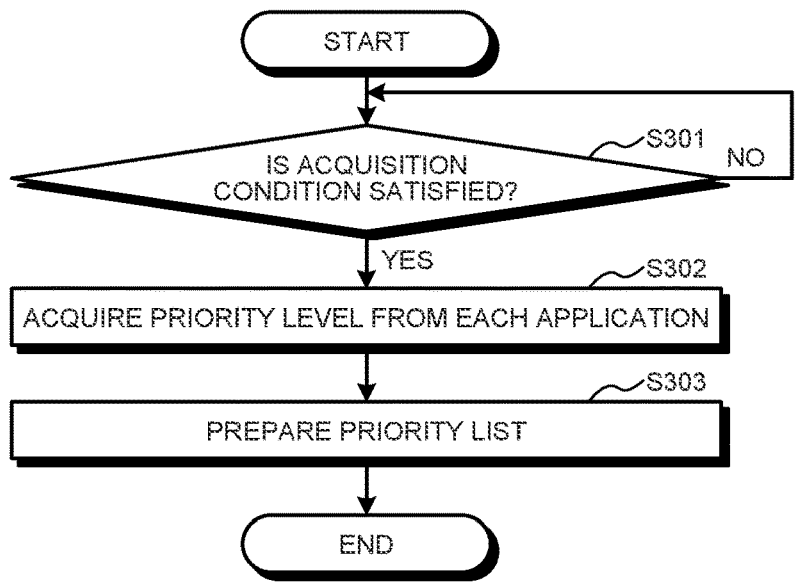
FIG. 10 is a flowchart of priority list preparation processing according to the second embodiment.

The following is an explanation of priority list preparation processing executed with the communication device 100-2 according to the second embodiment. FIG. 10 is a flowchart illustrating an example of the priority list preparation processing according to the second embodiment. First, the acquisition module 121-2 determines whether the current state satisfies the condition (acquisition condition) for acquiring the priority levels of the respective applications 111 (Step S301). The acquisition condition may be any desired condition. For example, the condition as follows may be used.

(C2-1) Whether the application 111 has occurred
(C2-2) whether the priority level of the application 111 has been set
(C2-3) Whether there has been data transmitted from the application 111

Whether the condition (C2-1) is satisfied can be determined according to whether, for example, the application 111 has been installed, whether a session used with the application 111 for communication has been established, whether communication using the established session has been started (such as outgoing call and incoming call in the case where the application 111 is used for telephone service), and/or whether the application 111 has been started.

In the case of using the condition (C2-1), the application 111 calls an acquisition module 121-1 in data transmission, and the acquisition module 121-1 may determine that data has been received when the acquisition module 121-1 is called. As another example, the system may have the structure in which the application 111 writes a message to a memory or the like shared with the acquisition module 121-2 when the reception state of the data changes, and the acquisition module 121-2 polls the memory to check presence/absence of the message. The acquisition module 121-2 may use information written to the data transmitted from the application 111. Examples of the information written to the data include a type-of-service (ToS) value of the Internet protocol version 4 (IPv4) header.

When the acquisition condition is not satisfied (No at Step S301), the processing is repeated until the acquisition condition is satisfied. When the acquisition condition is satisfied (Yes at Step S301), the acquisition module 121-2 acquires the priority level from each of the applications 111 (Step S302).

The preparation module 122-2 prepares a priority list with reference to the acquired priority levels (Step S303). The preparation module 122-2 stores the prepared priority list in, for example, the storage unit 140-2.

Figures 11, 12:
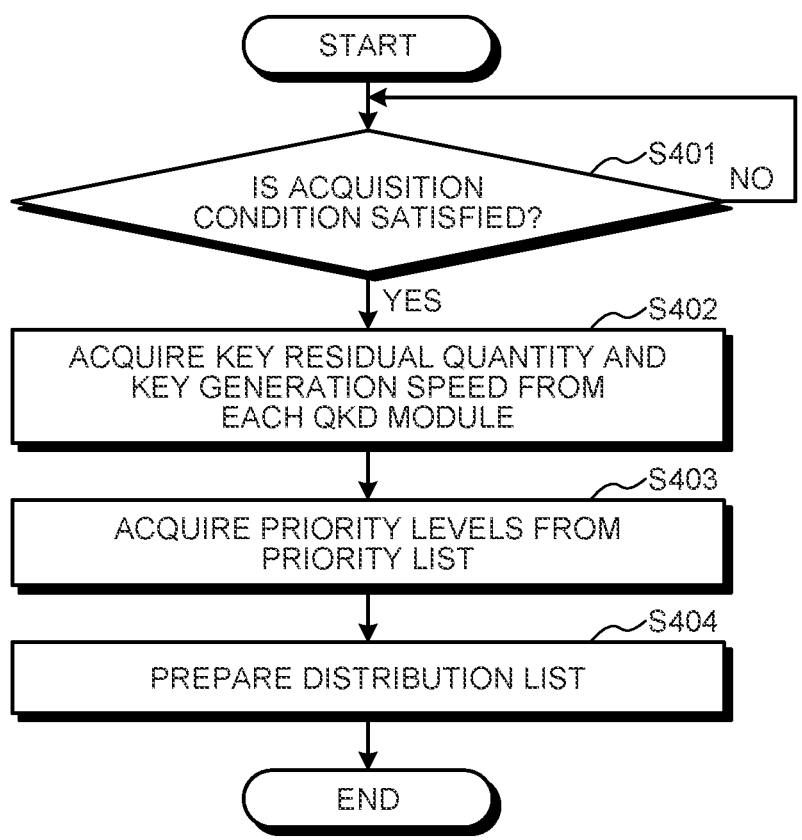
FIG. 11 is a diagram illustrating a configuration example of the priority list.
FIG. 12 is a flowchart of distribution list preparation processing according to the second embodiment.

FIG. 11 is a diagram illustrating a configuration example of the priority list. As illustrated in FIG. 11, the priority list includes identification information items and priority levels of the applications 111, as the elements.

The following is an explanation of distribution list preparation processing executed with the communication device 100-2 according to the second embodiment. FIG. 12 is a flowchart illustrating an example of the distribution list preparation processing according to the second embodiment.

The distribution list preparation processing according to the second embodiment is different from the distribution list preparation processing (FIG. 3) according to the first embodiment in that the second embodiment is additionally provided with processing of acquiring priority levels from the priority list (Step S403) and the distribution list is prepared using the acquired priority levels (Step S404). Step S401 and Step S402 are the same as Step S101 and Step S102 of FIG. 3, and an explanation thereof is omitted.

At Step S403, the acquisition module 121-2 acquires the identification information item and the priority level of each of the applications 111 from the priority list stored in the storage unit 140-2 (Step S403).

The preparation module 122-2 prepares a distribution list using the key residual quantities, the key generation speeds, and the priority levels of the respective applications 111 (Step S404).

The following is an explanation of examples of the method for preparing a distribution list and a method for determining the distribution destinations using the distribution list according to the present embodiment.

FIG. 13 is a diagram illustrating an example of a distribution list prepared using the priority levels of the applications 111. The distribution list in FIG. 13 is prepared with reference to the weights calculated from the key residual quantities and the key generation speeds, in the same manner as the third method for preparing the distribution list according to the first embodiment. The weights are calculated, for example, in the same manner as FIG. 7 described above.

The distribution list in FIG. 13 corresponds to an example of the distribution list in the case where a piece of transmission data requested by the application having a higher priority level than that of the other application is assigned to a QKD module 130 having the key generation speed and the key residual quantity at least one of which is larger than that of the other QKD modules 130.

Having a large weighting value means having large key resources including the key residual quantity and the key generation speed. For this reason, the determination module 124-2 determines the distribution destinations of the transmission data such that the application having a higher priority level is assigned to the QKD module 130 having a larger weight value.

The priority level having a larger value means that the application has higher priority. As illustrated in FIG. 11, the priority level "7" is set for the application 111a, and the priority level "0" is set for the application 111b.

The following explanation illustrates the case where the weights are calculated as illustrated in FIG. 7 and the priority levels are set as illustrated in FIG. 11, as an example. Because the application 111a has a higher priority level and the size of weight decreases in the order "QKD modules 130c, 130a, and 130b", the preparation module 122-2 prepares a distribution list such that data is distributed to the QKD modules 130 in the order in accordance with the weights, and when the QKD modules 130a and 130c having larger weights are used, the application 111a with the higher priority level is assigned thereto. FIG. 13 illustrates an example of a distribution list prepared like this.

The QKD modules 130a and 130c may be assigned as modules dedicated to the application 111a, or may be assigned to the application 111b when no data is transmitted from the application 111a.

Each of the QKD modules 130 may behave as a communication medium for the application 111, and, for example, the communication device 100-2 may determine the QKD module 130 to be used in the QKD modules 130 using priority control of an upper layer, such as transmission selection algorithm described in IEEE 802.1Q-2018.

In FIG. 13, the application 111a is assigned to the QKD modules 130a and 130c, but the application 111a may be assigned to the QKD module 130c alone, or the application 111a may be assigned to the QKD module 130a alone.

As described above, in the second embodiment, the QKD module 130 to be used is determined in accordance with the key residual quantity, the key generation speed, and the priority level of the application. This structure enables the communication device to preferentially assign the encryption key resources to the application having a higher priority level when a plurality of applications having different priority levels are executed.

Third Embodiment

A communication device according to a third embodiment determines the QKD modules serving as the data distribution destinations in accordance with requests from the applications.

Figure 14:
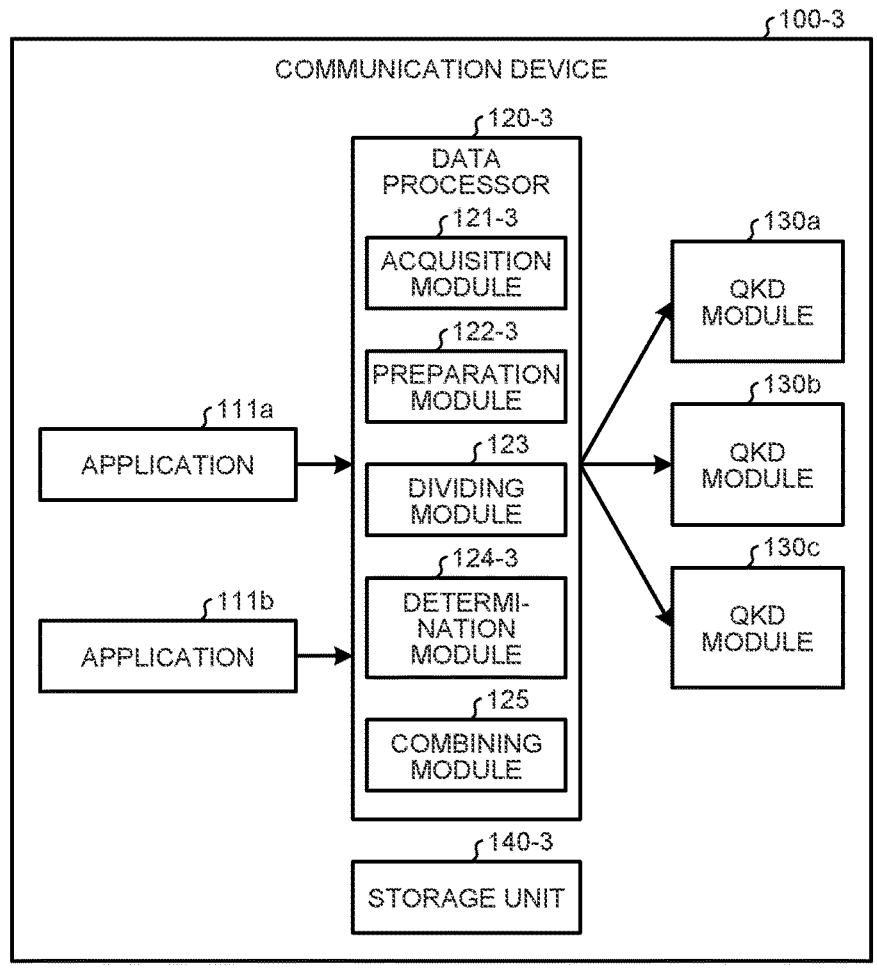
FIG. 14 is a block diagram of a communication device according to a third embodiment.

FIG. 14 is a block diagram illustrating an example of configuration of a communication device 100-3 according to the third embodiment. As illustrated in FIG. 14, the communication device 100-3 includes applications 111a and 111b, a data processor 120-3, QKD modules 130a, 130b, and 130c, and a storage unit 140-3.

Because the QKD modules 130a, 130b, and 130c and the applications 111a and 111b are the same as those in the first embodiment and the second embodiment, they are denoted with the same reference numerals, and an explanation thereof herein is omitted.

The data processor 120-3 includes an acquisition module 121-3, a preparation module 122-3, a dividing module 123, a determination module 124-3, and a combining module 125. Because the dividing module 123 and the combining module 125 are the same as those in the first embodiment, they are denoted with the same reference numerals, and an explanation thereof herein is omitted.

The acquisition module 121-3 is different from the acquisition module 121 of the first embodiment in that the acquisition module 121-3 further has a function of acquiring a request for communication quality such as the communication speed and the communication delay, from each of the applications 111.

The preparation module 122-3 is different from the preparation module 122 according to the first embodiment in that the preparation module 122-3 further has a function of preparing a request list describing requests by the respective applications 111 and prepares a distribution list with reference to the request list.

The determination module 124-3 determines the QKD modules 130 used for transmission of the pieces of transmission data, with reference to the distribution list prepared with the preparation module 122-3.

The storage unit 140-3 is different from the storage unit 140 according to the first embodiment in that the storage unit 140-3 further stores a request list therein.

Figure 15:
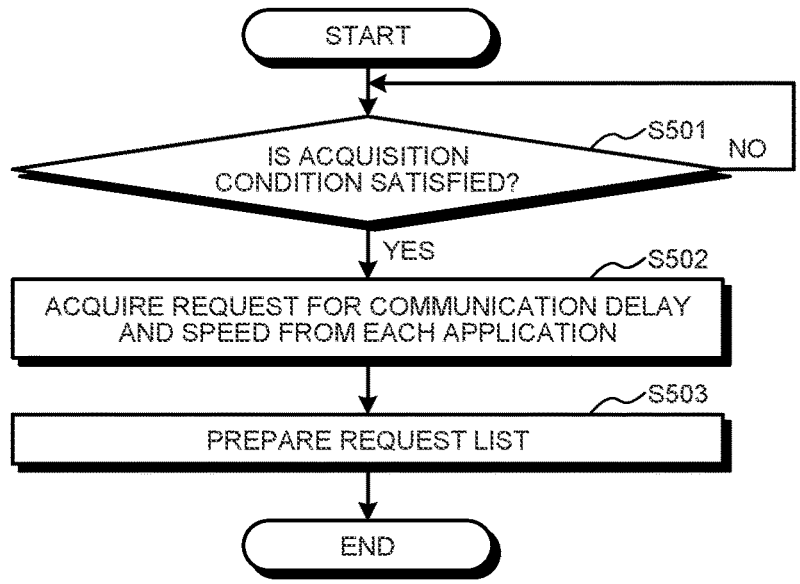
FIG. 15 is a flowchart of request list preparation processing according to the third embodiment.

The following is an explanation of request list preparation processing executed with the communication device 100-3 according to the third embodiment. FIG. 15 is a flowchart illustrating an example of the request list preparation processing according to the third embodiment.

First, the acquisition module 121-3 determines whether the current state satisfies the condition (acquisition condition) for acquiring the requests by the respective applications 111 (Step S501). The acquisition condition may be any desired condition. For example, the condition as follows may be used.

(C3-1) Whether the application 111 has occurred
(C3-2) Whether the request by the application 111 has been set
(C3-3) Whether data has been transmitted from the application 111

The conditions (C3-1) and (C3-3) are the same as those of the conditions (C2-1) and (C2-3) of the second embodiment.

The system may have a structure in which a control device connected in a remote manner determines the communication qualities (such as the communication speed and delay) of the respective applications 111, for example, to optimize the operation of the whole communication system and sets the communication qualities in the respective applications 111. In such a case, the acquisition module 121-3 may determine, as the acquisition condition, whether the control device has set the state, the parameter, and the requested value of the communication device 100-3.

When the acquisition condition is not satisfied (No at Step S501), the processing is repeated until the acquisition condition is satisfied. When the acquisition condition is satisfied (Yes at Step S501), the acquisition module 121-3 acquires the request (communication delay and communication speed) from each of the applications 111 (Step S502).

In the case of using the structure using a remote control device, the acquisition module 121-3 may acquire requests from a database in which the control device sets setting values of the respective applications 111. For example, the acquisition module 121-3 may acquire the setting values corresponding to the requests using a protocol, such as NETCONF/YANG. The system may have a structure in which the acquisition module 121-3 acquires the settings when the acquisition module 121-3 is notified or called back with a NETCONF client mounted in a remote manner when the NETCONF client accesses (read/write) the setting database of a NETCONF server mounted on the communication device 100-3.

The preparation module 122-3 prepares a request list with reference to the acquired requests (Step S503). The preparation module 122-3 stores the prepared request list in, for example, the storage unit 140-3.

Figures 16, 17:
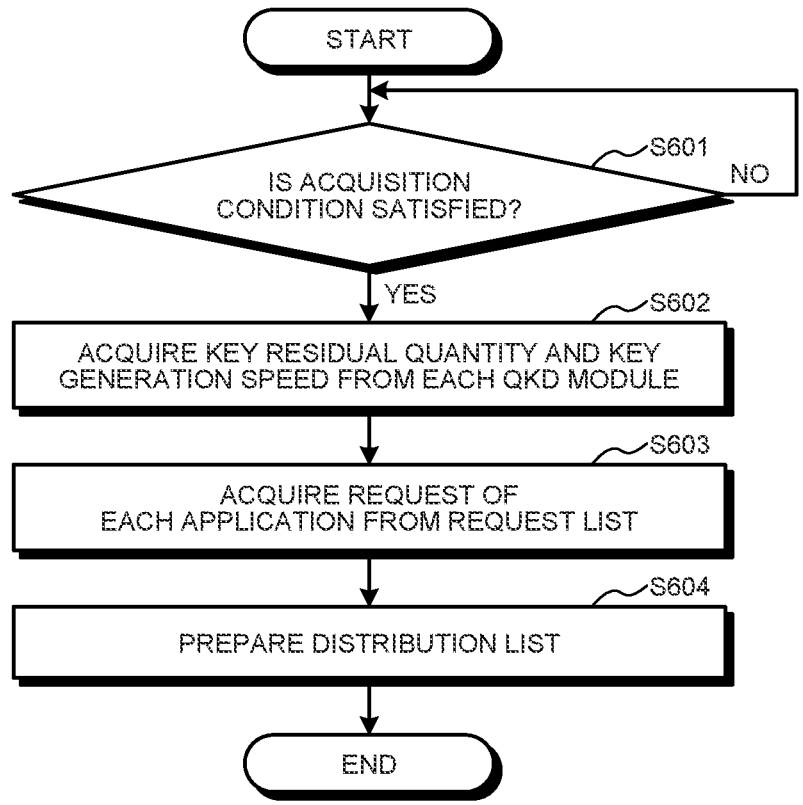
FIG. 16 is a diagram illustrating a configuration example of a request list.
FIG. 17 is a flowchart of distribution list preparation processing according to the third embodiment.

FIG. 16 is a diagram illustrating a configuration example of the request list. As illustrated in FIG. 16, the request list includes identification information, delay (ms), speed (bps), data size (byte), and period of time (sec) of each of the applications 111, as the elements.

The following is an explanation of distribution list preparation processing executed with the communication device 100-3 according to the third embodiment. FIG. 17 is a flowchart illustrating an example of the distribution list preparation processing according to the third embodiment.

The third embodiment is different from the distribution list preparation processing (FIG. 3) according to the first embodiment in that the third embodiment additionally includes processing (Step S603) of acquiring requests from the request list and a distribution list is prepared using the acquired requests (Step S604). Step S601 and Step S602 are the same as Step S101 and Step S102 of FIG. 3, and an explanation thereof is omitted.

At Step S603, the acquisition module 121-3 acquires the identification information and the request (communication delay and communication speed) of each of the applications 111 from the request list stored in the storage unit 140-3 (Step S603).

The preparation module 122-3 prepares a distribution list using the key residual quantities, the key generation speeds, and the requests by the respective applications 111 (Step S604).

The following is an explanation of the method for preparing a distribution list and the method for determining the distribution destinations using the distribution list according to the present embodiment.

Figures 20, 21:
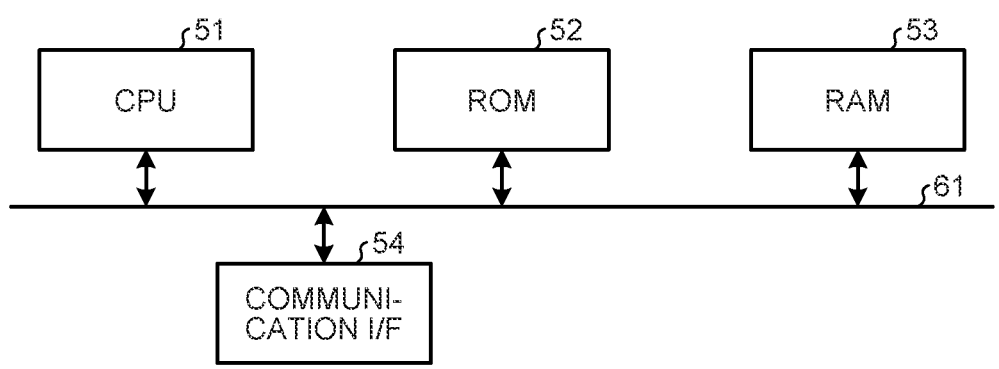
FIG. 20 is a diagram illustrating an example of a distribution list.
FIG. 21 is a hardware configuration diagram of the communication device according to the first to the third embodiments.

FIG. 18 is a diagram illustrating an example of the key residual quantities and the key generation speeds of the respective QKD modules 130 at the time when the distribution list is prepared. FIG. 19 is a diagram illustrating examples of the communication delay and the communication speed estimated (calculated) for the application 111a. FIG. 20 is a diagram illustrating an example of the prepared distribution list. Suppose that the applications 111 have requested the delays and the like illustrated in FIG. 16.

In the request list in FIG. 16, the application 111a makes a higher request than that of the application 111b. For this reason, the preparation module 122-3 searches for the QKD module 130 satisfying the request for the application 111a. First, the preparation module 122-3 calculates the communication delay, the maximum speed, and the time for which the maximum speed is maintained in the case where the application 111a uses each of the QKD modules 130. FIG. 19 illustrates examples of the calculated values of the maximum speed in the case where the key residual quantity exists, the transmission time in the case where the key residual quantity exists, the maintaining period of the maximum speed, the speed after the maintaining period, the transmission time after the maintaining period, and the propagation delay.

The maximum speed is calculated with, for example, the following expressions (2-1) and (2-2).

Maximum speed=min (data size (bit) of one transmission×number of data transmittable times per unit time, line speed in the case of non-encryption) (2-1)

Number of data transmittable times per unit time= (key residual quantity (bit)+key generation speed (bps)×unit time)/number of bits of encryption key for one encryption (2-2)

The number of data transmittable times per unit time is limited with the key residual quantity and the key generation speed. The maximum speed is calculated as the smaller one of the data size (bit) transmittable per unit time and the line speed in the case of non-encryption.

The data size transmittable per unit time is calculated with the product of the data size of one transmission and the number of data transmittable times per unit time. The number of data transmittable times per unit time is expressed with the value acquired by dividing the quantity of the encryption key existing in the unit time by the number of bits of the encryption key for one encryption. The quantity of the encryption key existing in the unit time serves as the sum of the key residual quantity and the quantity (key generation speed×unit time) of the encryption key generated per unit time.

Suppose that an encryption key of 128 bits is used for one packet. In this case, the maximum speed of the QKD module 130a for the application 111a is calculated as "200 (byte)× 8×(1024+256)/128=16000 (bps)". The maximum speeds of the QKD modules 130b and 130c are also calculated in the same manner. In addition, the maximum speed in the case where both the QKD modules 130a and 130c are assigned to the application 111a is calculated as "200×8×(1280+ 2560)/128=48000".

The transmission time is calculated with, for example, the following expression (3).

Transmission time=data size (bit) for one transmission/maximum speed (bps)  (3)

To calculate the time required until the data size for one transmission is transmitted at the maximum speed, the data size for one transmission is divided by the maximum speed in the expression (3).

The transmission time of the QKD module 130a for the application 111a is "200 (byte)×8/maximum speed (=16000)= 0.1 (sec)". The transmission speeds of the QKD modules 130b and 130c are also calculated in the same manner.

In the case of assigning both the QKD modules 130a and 130c, one having the larger value in the transmission times of the two QKD modules 130 is set as a response to the request from the application. Accordingly, the transmission time is calculated as "0.1" being the longer transmission time in the QKD modules 130a and 130c.

The maintaining period of the maximum speed is calculated, for example, by the following expression (4).

Maintaining period of maximum speed=((key residual quantity/number of bits of encryption key for one encryption key)×data size (bit) for one transmission)/(line speed in non-encryption−key generation speed×number of bits of encryption key for one encryption)  (4)

The maintaining period of the maximum speed means the time spent until the whole key residual quantity is spent. The encryption key is generated while consumed. When the data quantity (bps) encrypted with the encryption key generated per unit time is smaller than the line speed, the encryption key in stock is consumed. For this reason, a difference between the data quantity consumed per unit time on the basis of the line speed and the data quantity transmitted per unit time on the basis of the key generation speed is compensated with an encryption key in stock. The time (=maintaining period of the maximum speed) spent until the encryption key in stock is run out calculated by dividing the data quantity that can be transmitted with the encryption key in stock by a difference between the data quantity consumed per unit time on the basis of the line speed and the data quantity transmitted per unit time on the basis of the key generation speed.

The maintaining period of the maximum speed of the QKD module 130a for the application 111a is "(1024/128)×200×8/(1000000−200×8×(256/128))=0.012 (sec)". The maintaining periods of time of the maximum speed for the QKD modules 130b and 130c are also calculated in the same manner. The maintaining period of the maximum speed in the case of assigning both the QKD modules 130a and 130c is the shorter one of the maintaining period of the maximum speed for the QKD module 130a and the maintaining period of the maximum speed for the QKD module 130c.

The speed after the maintaining period is calculated, for example, by the following expression (5).

Speed after maintaining period=data size (bit) for one transmission×key generation speed/number of bits of encryption key for one encryption  (5)

The speed after the maintaining period of the QKD module 130a for the application 111a is "200×8×(256/128)= 3200 (bps)". The speeds after the maintaining period are also calculated for the QKD modules 130b and 130c and for the case of assigning both the QKD modules 130a and 130c, in the same manner.

The transmission time after the maintaining period is calculated, for example, by the following expression (6).

Transmission time after maintaining period=data size (bit) for one transmission/speed (bps) after maintaining period  (6)

The transmission time after the maintaining period of the QKD module 130a for the application 111a is "200 (byte)× 8/speed after maintaining period=0.5 (sec)". The transmission times after the maintaining periods of time of the QKD modules 130b and 130c are also calculated in the same manner.

In the case of assigning both the QKD modules 130a and 130c, one having the larger value in the transmission times of the two QKD modules 130 is set as a response to the request from the application. Accordingly, the transmission time is calculated as "0.5" that is the longer transmission time in the QKD modules 130a and 130c.

The communication delay is calculated by, for example, the sum of the transmission time and the propagation delay. The propagation delay is calculated, for example, as a value ½ as large as the roundtrip time between the opposed QKD modules 130. For example, a measured value may be used as the roundtrip time.

The preparation module 122-3 compares the maximum speed in the case where the key residual quantity exists, the transmission time in the case where the key residual quantity exists, the maintaining period of the maximum speed, the speed after the maintaining period, the transmission time after the maintaining period, and the communication delay (transmission time+propagation delay) estimated (calculated) as described above with the request of each of the applications 111.

The QKD modules 130 satisfy the request "the delay is 1 ms or less, the speed is 40 kbps or more, and the period is 0.01 (sec) or more" by the application 111a, only in the case of assigning the two QKD modules 130a and 130c. The QKD module 130b serves as the QKD module 130 satisfying the request "the delay is 20 ms or less, the speed is 4 kbps or more, and the period is 0.002 (sec) or more" by the application 111b. On the basis of these results, the preparation module 122-3 prepares a distribution list (FIG. 20) to assign the application 111a to the QKD modules 130a and 130c and assigning the application 111b to the QKD module 130b.

As described above, according to the third embodiment, the QKD module to be used is determined in accordance with the key residual quantity, the key generation speed, and the request of the application. This structure enables preferential assignment of the encryption key resource to the application having a higher request in the cases where the system includes a plurality of applications having different requests.

As described above, the first to the third embodiments enable increase in transmittable and receivable data quantity.

The following is an explanation of hardware configuration of each of the communication devices according to the first to the third embodiments with reference to FIG. 21. FIG. 21 is an explanatory drawing illustrating a hardware configuration example of each of the communication devices according to the first to the third embodiments.

Each of the communication devices according to the first to the third embodiments includes a control device, such as a CPU 51, storage devices, such as a read only memory (ROM) 52 and a random access memory (RAM) 53, a communication interface 54 connected to a network and executing communication, and a bus 61 connecting the units.

A computer program executed with each of the communication devices according to the first to the third embodiment are installed in advance in the ROM 52 or the like to be provided.

The computer program executed with each of the communication devices according to the first to the third embodiments may be configured to be recorded on a computer readable recording medium, such as a compact disk read only memory (CD-ROM), a flexible disk (FD), a compact disk recordable (CD-ROM), and a digital versatile disk (DVD), in a file of an installable form or an executable form, and provided as a computer program product.

As another example, the computer program executed with each of the communication devices according to the first to the third embodiments may be configured to be stored in a computer connected to a network, such as the Internet, and provided by being downloaded via the network. The computer program executed with each of the communication devices according to the first to the third embodiments may be configured to be provided or distributed via a network, such as the Internet.

The computer program executed with each of the communication devices according to the first to the third embodiments may cause a computer to function as the units of the communication device described above. In the computer, the CPU 51 is capable of reading a computer program from a computer readable storage medium onto the main storage device and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
    a plurality of communication processors, each of the plurality of communication processors being configured to generate an encryption key by quantum key distribution with an external communication device, encrypt data by using the generated encryption key, and transmit the data to the external communication device; and
    one or more processors configured to:
        divide data requested to be transmitted by an application into a plurality of pieces of transmission data;
        determine, from among the plurality of communication processors, one or more communication processors to be used for transmission of the divided plurality of pieces of the transmission data;
        divide each of data requested to be transmitted by a plurality of applications provided with respective priority levels into a plurality of pieces of transmission data; and
        preferentially determine, from among the plurality of applications, for an application whose priority level is higher than that of another application, each of the one or more communication processors of which at least one of a generation speed and a residual quantity of the encryption key is larger than that of another communication processor for transmission of the transmission data.

2. The device according to claim 1, wherein the one or more processors are configured to determine the one or more communication processors to be used for transmission of the plurality of pieces of the transmission data in such a manner that each of the one or more communication processors of which at least one of a generation speed and a residual quantity of the encryption key is larger than that of another communication processor transmits more pieces of the transmission data.

3. The device according to claim 2, wherein the one or more processors are configured to determine, from among the plurality of communication processors, a communication processor having the residual quantity equal to or larger than a quantity of the encryption key required for transmission of the transmission data, as the one or communication processors to be used for the transmission of the transmission data.

4. The device according to claim 2, wherein the one or more processors are configured to determine, from among the plurality of communication processors, a communication processor having the residual quantity larger than residual quantities of other communication processors, as the one or communication processors to be used for transmission of the transmission data.

5. The device according to claim 2, wherein the one or more processors are configured to determine the one or communication processors to be used for transmission of the pieces of the transmission data in such a manner that the one or communication processors each having a larger weight than weights of other communication processors transmit more pieces of the transmission data, the weight being calculated based on at least one of the generation speed and the residual quantity.

6. The device according to claim 1, wherein the one or more processors are configured to determine the one or more communication processors to be used for transmission of the pieces of the transmission data from among the communication processors satisfying at least one of a communication speed and a communication delay requested by the application, based on at least one of generation speeds of the encryption key of the communication processors and residual quantities of the encryption key of the communication processors.

7. The device according to claim 6, wherein the one or more processors are configured to determine the one or more communication processors to be used for transmission of the pieces of the transmission data from among the communication processors satisfying at least one of the communication speed and the communication delay requested by the application, based on at least one of communication maximum speeds calculated based on the generation speeds and the residual quantities and communication delays calculated based on the maximum speeds.

8. The device according to claim 1, wherein each of the plurality of communication processors is configured to receive transmission data encrypted and transmitted by the external communication device, and decrypt the received communication data, and the one or more processors are configured to combine the transmission data decrypted by the plurality of communication processors.

9. A computer program product comprising a non-transitory computer readable medium including programmed instructions, the instructions causing a computer, which is included in a communication device including a plurality of communication processors each generating an encryption key by quantum key distribution with an external communication device, encrypting data by using the generated encryption key, and transmitting the data to the external communication device, to execute:

dividing data requested to be transmitted by an application into a plurality of pieces of transmission data; and determining, from among the plurality of communication processors, one or more communication processors to be used for transmission of the divided plurality of pieces of the transmission data, wherein the dividing includes dividing each of data requested to be transmitted by a plurality of applications provided with respective priority levels into a plurality of pieces of transmission data; and the determining includes preferentially determining, from among the plurality of applications, for an application whose priority level is higher than that of another application, each of the one or more communication processors of which at least one of a generation speed and a residual quantity of the encryption key is larger than that of another communication processor for transmission of the transmission data.

10. A communication system comprising:

a transmission device configured to transmit data; and a reception device configured to receive the data, the transmission device comprising:

a plurality of communication processors, each of the plurality of communication processors being configured to generate an encryption key by quantum key distribution with an external communication device, encrypt data by using the generated encryption key, and transmit the data to the reception device; and one or more processors configured to:

divide data requested to be transmitted by an application into a plurality of pieces of transmission data;

determine, from among the plurality of communication processors, one or more communication processors to be used for transmission of the divided plurality of pieces of the transmission data;

divide each of data requested to be transmitted by a plurality of applications provided with respective priority levels into a plurality of pieces of transmission data; and preferentially determine, from among the plurality of applications, for an application whose priority level is higher than that of another application, each of the one or more communication processors of which at least one of a generation speed and a residual quantity of the encryption key is larger than that of another communication processor for transmission of the transmission data.

11. A communication method comprising:

generating, by each of a plurality of communication processors, an encryption key by quantum key distribution with an external communication device, encrypting data by using the generated encryption key, and transmitting the data to the external communication device;

dividing, by a dividing module, data requested to be transmitted by an application into a plurality of pieces of transmission data; and determining, by a determination module, from among the plurality of communication processors, one or more communication processors to be used for transmission of the divided plurality of pieces of the transmission data, wherein the dividing includes dividing each of data requested to be transmitted by a plurality of applications provided with respective priority levels into a plurality of pieces of transmission data; and the determining includes preferentially determining, from among the plurality of applications, for an application whose priority level is higher than that of another application, each of the one or more communication processors of which at least one of a generation speed and a residual quantity of the encryption key is larger than that of another communication processor for transmission of the transmission data.

* * * * *